(12) United States Patent  
Kugelmass et al.

(10) Patent No.: US 12,525,366 B2
(45) Date of Patent: Jan. 13, 2026

(54) NUCLEAR REACTOR SYSTEM AND METALLIC COOLANT COMPOSITION

(71) Applicant: Last Energy Inc., Washington, DC (US)

(72) Inventors: Bret Kugelmass, Washington, DC (US); Mark Blomstrom, Northbridge, MA (US); Charles Cole, Washington, DC (US); Phoebe Lind, Washington, DC (US); Daniel Theobald, Washington, DC (US)

(73) Assignee: Last Energy Inc., Washington, DC (US)

( * ) Notice: Subject to any disclaimer, the term of this patent is extended or adjusted under 35 U.S.C. 154(b) by 0 days.

(21) Appl. No.: 18/756,611

(22) Filed: Jun. 27, 2024

(65) Prior Publication Data

US 2025/0006385 A1    Jan. 2, 2025

Related U.S. Application Data

(60) Provisional application No. 63/523,885, filed on Jun. 28, 2023.

(51) Int. Cl.
*G21C 9/02* (2006.01)
*G21C 11/08* (2006.01)
(Continued)

(52) U.S. Cl.
CPC ............ *G21C 9/022* (2013.01); *G21C 11/088* (2013.01); *G21C 15/18* (2013.01); *G21C 15/28* (2013.01); *G21C 1/02* (2013.01); *G21C 3/54* (2013.01)

(58) Field of Classification Search
CPC ............. G21C 9/022; G21C 3/54; G21C 1/02
(Continued)

(56) References Cited

U.S. PATENT DOCUMENTS 3,042,599 A * 7/1962 Biehl ................. G21C 1/14
                                                   376/904
3,182,002 A * 5/1965 Laithwaite ............. G21C 1/03
                                                   376/403

(Continued)

FOREIGN PATENT DOCUMENTS

DE         2106976 A1 *  8/1972
DE         9420654 U1 * 11/1995

OTHER PUBLICATIONS

International Search Report and Written Opinion for International Application No. PCT/US24/35808 mailed on Dec. 31, 2024, 11 pages.

(Continued)

*Primary Examiner* — Lily C Garner
(74) *Attorney, Agent, or Firm* — Run8 Patent Group, LLC; Peter Miller; Madison Tyrcha

(57) ABSTRACT

One variation of a system includes: a nuclear reactor; a shield arranged about the nuclear reactor; a metallic coolant; and a set of melt seals. The nuclear reactor includes a pressure vessel and nuclear fuel arranged within a lower region of the pressure vessel. The metallic coolant includes a mixture of metals and is configured to: occupy a liquid state within an operating temperature range; occupy an interstitial volume between the nuclear reactor and the shield; and occupy the lower region of the pressure vessel encompassing the nuclear fuel. The set of melt seals are arranged on the pressure vessel and configured to open to enable transfer of a volume of the metallic coolant from the interstitial volume into the lower region of the pressure vessel in response to temperatures within the pressure vessel exceeding the operating temperature range.

12 Claims, 6 Drawing Sheets

(51) Int. Cl.
　　　*G21C 15/18*　　(2006.01)
　　　*G21C 15/28*　　(2006.01)
　　　*G21C 1/02*　　(2006.01)
　　　*G21C 3/54*　　(2006.01)

(58) Field of Classification Search
　　　USPC .................................................. 376/336
　　　See application file for complete search history.

(56) References Cited

U.S. PATENT DOCUMENTS

| | | | | |
|---|---|---|---|---|
| 3,377,993 | A * | 4/1968 | Buck | G21H 1/00 |
| | | | | 976/DIG. 410 |
| 4,104,121 | A * | 8/1978 | Malaval | G21C 9/027 |
| | | | | 376/337 |
| 4,104,122 | A * | 8/1978 | Malaval | G21C 9/033 |
| | | | | 376/328 |
| 4,401,619 | A | 8/1983 | McEdwards | |
| 4,696,791 | A * | 9/1987 | Straub | G21C 1/322 |
| | | | | 976/DIG. 186 |
| 5,333,156 | A * | 7/1994 | Lemercier | G21C 9/022 |
| | | | | 376/338 |
| 5,459,768 | A * | 10/1995 | Stockhausen | G21C 9/004 |
| | | | | 220/89.4 |
| 6,285,727 | B1 * | 9/2001 | Bredolt | G21C 9/016 |
| | | | | 376/280 |
| 9,892,805 | B2 * | 2/2018 | Larrion | B66B 5/027 |
| 10,510,450 | B2 * | 12/2019 | Arafat | G21C 5/14 |
| 11,373,769 | B2 * | 6/2022 | Hinds | G21C 15/18 |
| 12,051,514 | B2 * | 7/2024 | Morin | G21C 15/12 |
| 2012/0328067 | A1 * | 12/2012 | Kurita | G21C 13/02 |
| | | | | 376/280 |
| 2020/0373027 | A1 | 11/2020 | Gramlich et al. | |
| 2023/0154635 | A1 | 5/2023 | Arndt et al. | |
| 2023/0395270 | A1 * | 12/2023 | Benson | G21C 11/06 |
| 2025/0132064 | A1 * | 4/2025 | Kugelmass | G21C 13/0875 |
| 2025/0157680 | A1 * | 5/2025 | Kugelmass | G21C 13/028 |

OTHER PUBLICATIONS

Notification of the International Application Number and of the International Filing Date for International Patent Application No. PCT/US24/35808 mailed on Jul. 24, 2024; 1 page.

* cited by examiner

NUCLEAR REACTOR SYSTEM AND METALLIC COOLANT COMPOSITION

CROSS-REFERENCE TO RELATED APPLICATIONS

This Application claims the benefit of U.S. Provisional Application No. 63/523,885 filed on 28 Jun. 2023, which is incorporated in its entirety by this reference.

TECHNICAL FIELD

This invention relates generally to the field of nuclear reactors and more specifically to a new and useful nuclear reactor system with an emergency heat removal system in the field of nuclear reactors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
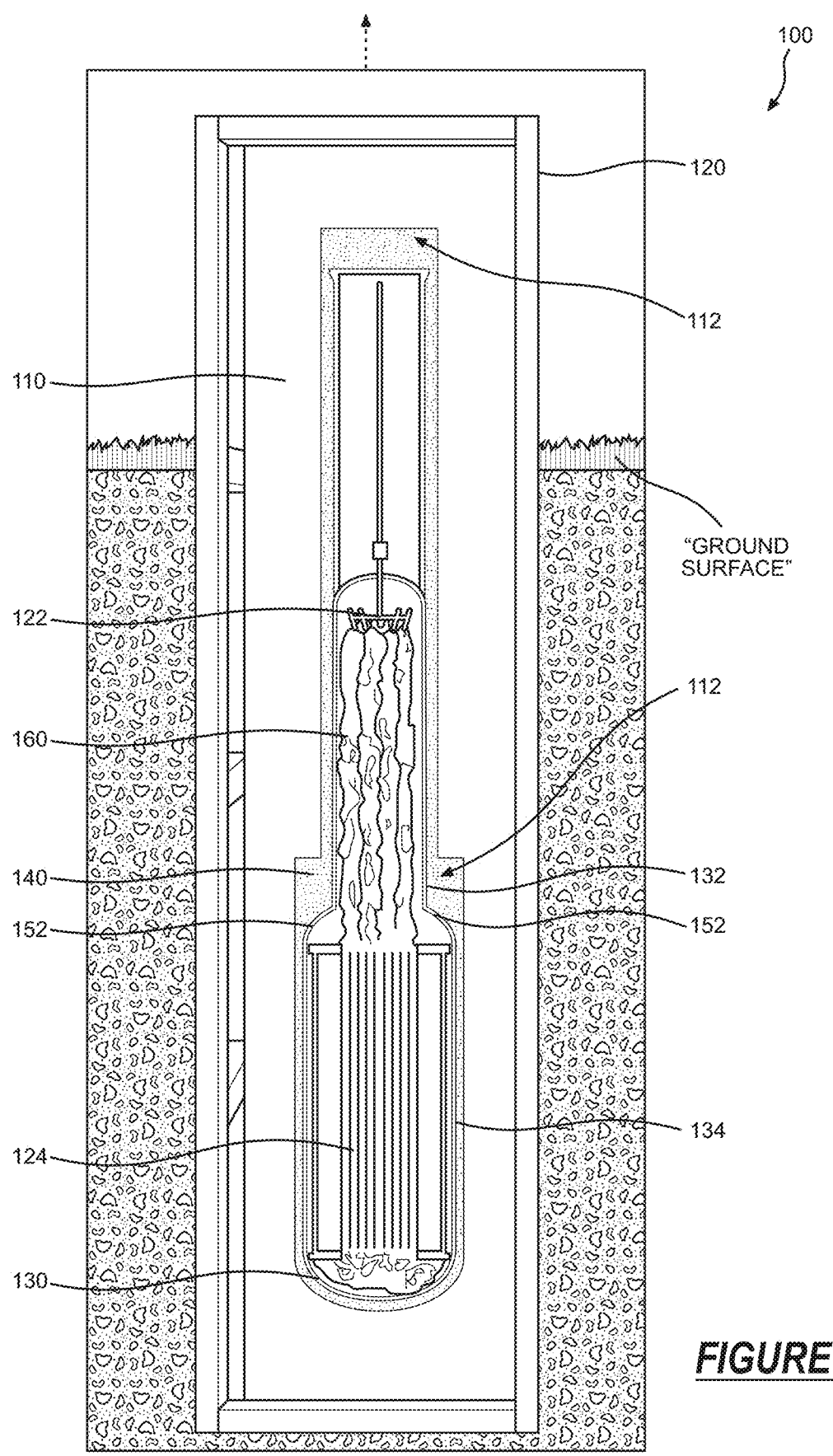
FIG. 1 is a schematic representation of a system.
Figure 2:
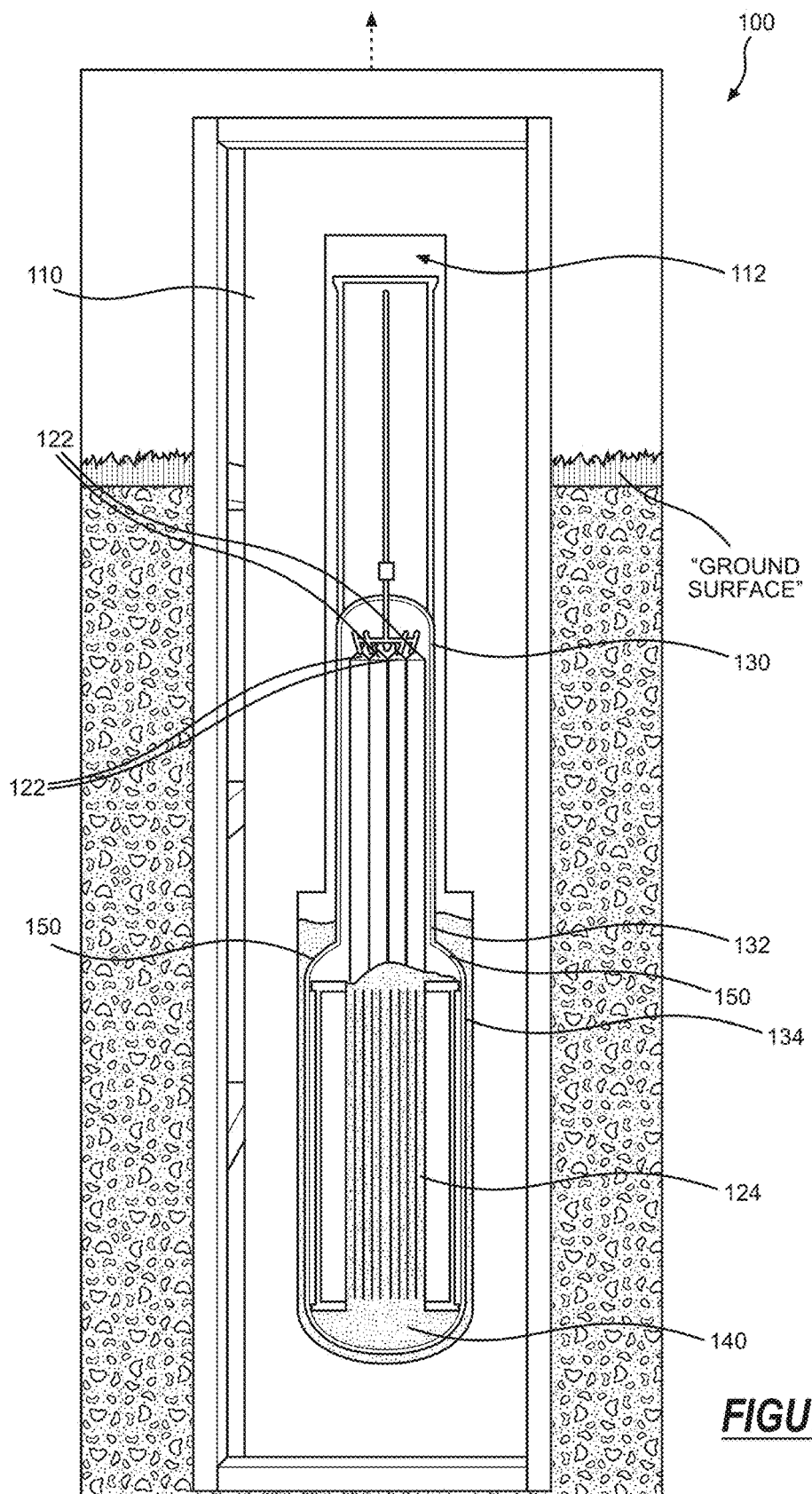
FIG. 2 is a schematic representation of one variation of the system.

As shown in FIGS. 1 and 2, a system 100 includes: a shield 110; a nuclear reactor 120; a metallic coolant 140; and a melt seal 150.

The shield 110 defines an internal volume and is configured to absorb radiation.

The nuclear reactor 120 includes: a pressure vessel 130; a nuclear fuel 124; and a set of control rods 122. The pressure vessel 130: is arranged within the internal volume; defines an upper region 132; defines a lower region 134 arranged below the upper region 132; and an upper seal slot 152 interposed between the upper region 132 and the lower region 134. The nuclear fuel 124 is arranged within the lower region 134 of the pressure vessel 130 and is configured to heat a working fluid 160 entering the pressure vessel 130, via a fission reaction. The set of control rods 122 are configured to transition between the upper region 132 and the lower region 134 of the pressure vessel 130 to moderate the fission reaction within the nuclear fuel 124.

The metallic coolant 140: includes a mixture of metals in a liquid state within an operating temperature range of the nuclear reactor 120; is configured to occupy an interstitial volume 112 between the shield 110 and the pressure vessel 130; transfers thermal energy from the pressure vessel 130 into the shield 110 to distribute heat around the pressure vessel 130 within the operating temperature range; and absorbs radiation emitted by the nuclear reactor 120.

The melt seal 150 is: arranged in the upper seal slot 152 of the pressure vessel 130; configured to retain a volume of the metallic coolant 140 within the interstitial volume 112 between the shield 110 and the pressure vessel 130 during operation of the nuclear reactor 120; and configured to unseal from the upper seal slot 152 to release the volume of the metallic coolant 140, in a first direction, into the lower region 134 of the pressure vessel 130 in response to temperatures within the pressure vessel 130 exceeding the operating temperature range.

1.1 Variation: Eutectic Alloy+Multiple Melt Seals

Figure 4:
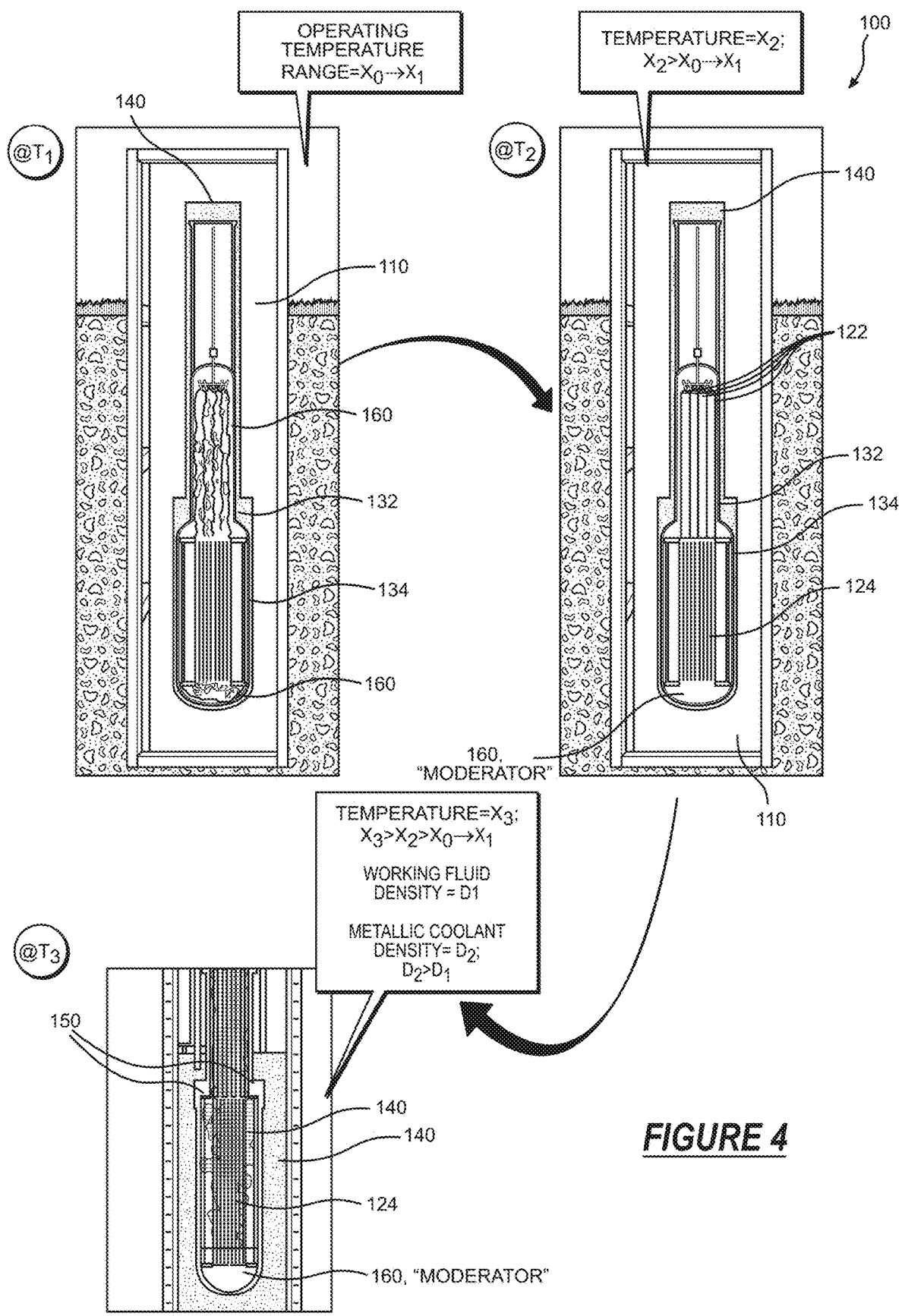
FIG. 4 is a schematic representation of one variation of the system.

In one variation shown in FIG. 4, the system 100 includes: a nuclear reactor 120; a shield 110; a metallic coolant 140; and a set of melt seals 150.

The nuclear reactor 120 includes a pressure vessel 130 and a nuclear fuel 124 arranged within a lower region 134 of the pressure vessel 130.

The shield 110 is arranged about the nuclear reactor 120.

The metallic coolant 140 includes: a first proportion of a first metal; and a second proportion of a second metal. The metallic coolant 140 is operable in a first configuration, the metallic coolant 140 occupying a liquid state within an operating temperature range of the nuclear reactor 120 and occupying an interstitial volume 112 between the nuclear reactor 120 and the shield 110 in the first configuration. The metallic coolant 140 is further operable in a second configuration, the metallic coolant 140: occupying the liquid state within the operating temperature range; occupying the interstitial volume 112 between the nuclear reactor 120 and the shield 110; occupying the lower region 134 of the pressure vessel 130 encompassing the nuclear fuel 124; absorbing radiation and thermal energy emitted by the nuclear fuel 124; and displacing moderator and working fluid 160 from the lower region 134 of the pressure vessel 130 toward the shield 110 in the second configuration.

The set of melt seals 150: is arranged on the pressure vessel 130; and is configured to open to enable transfer of a volume of the metallic coolant 140 from the interstitial volume 112 into the lower region 134 of the pressure vessel 130 in response to temperatures within the pressure vessel 130 exceeding the operating temperature range.

1.2 Variation: Reactor Core+Metal Mixture

In another variation, the system 100 includes: a shield 110, a nuclear reactor 120, a metallic coolant 140, and an upper melt seal 150. The shield 110: is configured to absorb radiation; and defines an internal volume.

The nuclear reactor 120 includes: a pressure vessel 130; a reactor core 126; and a nuclear fuel 124. The pressure vessel 130: is arranged within the internal volume of the shield 110; includes a fluid inlet 136 configured to receive working fluid 160 from an external working fluid 160 supply; includes a fluid outlet 138 configured to emit working fluid 160 from the pressure vessel 130; defines an upper region 132; defines a lower region 134 arranged below the upper region 132; and defines an upper seal slot 152 interposed between the upper region 132 and the lower region 134.

The reactor core 126: is configured to operate within an operating temperature range; includes a nuclear fuel 124 arranged within the lower region 134 of the pressure vessel 130 and configured to heat working fluid 160 entering the pressure vessel 130 through the fluid inlet 136 via a fission reaction; and includes a set of control rods 122 configured to transition between a retracted position in the upper region 132 and an extended position in the lower region 134 of the pressure vessel 130 to moderate the fission reaction within the nuclear fuel 124.

The metallic coolant 140: includes a mixture of metals (or a metal compound or alloy) in a liquid state within the operating temperature range; occupies an interstitial volume 112 between an inner surface of the shield 110 and an outer surface of the pressure vessel 130; is configured to flow around the pressure vessel 130 via conduction to transfer thermal energy between the pressure vessel 130 and the shield 110; and is configured to absorb radiation emitted by the reactor core 126.

The upper melt seal 150: is arranged in the upper seal slot 152 of the pressure vessel 130; is configured to seal the pressure vessel 130 from the metallic coolant 140 during operation of the reactor core 126 within the operating temperature range; and is configured to unseal from the upper seal slot 152 in the pressure vessel 130 to release the metallic coolant 140 into the pressure vessel 130 in response to temperatures within the pressure vessel 130 exceeding the operating temperature range.

In response to the upper melt seal 150 unsealing from the upper seal slot 152 in the pressure vessel 130, the metallic coolant 140 is further configured to: displace water out of the lower region 134 of the pressure vessel 130 and away from the nuclear fuel 124; absorb decay energy from the nuclear fuel 124; and conduct thermal energy from the nuclear fuel 124 into the shield 110.

1.2.1 Lower Melt Seal

In one variation, the pressure vessel 130 further defines a lower seal slot 152 arranged proximal a base of the lower region 134.

In this variation, the nuclear reactor 120 further includes a lower melt seal 150: arranged in the lower seal slot 152 of the pressure vessel 130; configured to seal the pressure vessel 130 from the metallic coolant 140 during operation of the reactor core 126 within the operating temperature range; and configured to unseal from the lower seal slot 152 in the pressure vessel 130 in response to temperatures within the pressure vessel 130 exceeding the operating temperature range.

In this variation, in response to the upper melt seal 150 opening within the upper seal slot 152 and in response to the lower melt seal 150 opening within the lower seal slot 152, the metallic coolant 140 is further configured to circulate between the nuclear fuel 124 in the lower region 134 of the pressure vessel 130 and the shield 110 via the lower seal slot 152 and the upper seal slot 152.

1.4 Metallic Coolant Composition

A metallic coolant composition 140 includes: a first proportion of lead configured to absorb gamma radiation emitted by a nuclear fuel 124 within a nuclear reactor 120; and a second proportion of bismuth. The second proportion of bismuth is configured to: absorb gamma radiation emitted by the nuclear fuel 124; increase an effective boiling temperature of the metallic coolant composition 140; and reduce an effective melting temperature of the metallic coolant composition 140. The second proportion of bismuth further cooperates with the first proportion of lead to maintain the metallic coolant composition 140 in a liquid state within an operating temperature range of the nuclear reactor 120 and occupy a volume adjacent the nuclear reactor 120.

In one variation, the metallic coolant composition 140 further includes a third proportion of tin configured to decrease a viscosity of the metallic coolant composition 140.

In another variation, the metallic coolant composition 140 further includes a fourth proportion of cadmium configured to absorb neutron radiation emitted by the nuclear fuel 124.

In yet another variation, the metallic coolant composition 140 further includes the fourth proportion of cadmium in place of (i.e., without, excluding) the third proportion of tin.

In yet another variation, the metallic coolant composition 140 further includes the fourth proportion of cadmium in place of (i.e., without, excluding) the second proportion of bismuth.

2. Applications

Generally, the system 100 is configured: to heat a working fluid 160 (e.g., water) by passing the working fluid 160 along (or near) nuclear fuel 124 undergoing nuclear fission; to feed this heated working fluid 160 to a turbine, thermoelectric generator, or other external thermal power generation system for conversion of thermal energy, in the working fluid 160, into electricity; and to return low-temperature (e.g., cool, condensed) working fluid 160 to the nuclear fuel 124 for reheating.

The system 100 includes: a shield 110, such as configured for full or partial burial underground; and a nuclear reactor 120. The nuclear reactor 120 includes: a pressure vessel 130 arranged within and internally offset from the shield 110 to form an interstitial volume 112 between the pressure vessel 130 and the shield 110; nuclear fuel 124 (zirconium-coated uranium nuclear fuel 124) arranged in a lower region 134 of the pressure vessel 130; and a set of control rods 122 configured to extend into and retract from the nuclear fuel 124 to moderate fission reactions within the nuclear fuel 124.

The pressure vessel 130 further includes: a fluid inlet 136 configured to receive and direct lower-temperature working fluid 160 (e.g., water) toward the nuclear fuel 124; a fluid outlet 138 configured to communicate higher-temperature working fluid 160 from the nuclear fuel 124 to an external thermal power generation system; an upper seal slot 152 arranged in the pressure vessel 130 above a highest position of nuclear fuel 124 in the reactor core 126; and a lower seal slot 152 arranged in the pressure vessel 130 proximal or below a lowest position of nuclear fuel 124 in the reactor core 126. The nuclear reactor 120 also includes: an upper melt seal 150 arranged in the upper seal slot 152; and a lower melt seal 150 arranged in the lower seal slot 152 and cooperating with the upper melt seal 150 to seal the pressure vessel 130 while the nuclear reactor 120 operates within an operating condition range (i.e., less than a maximum temperature and pressure threshold).

2.1 Metallic Coolant

The system 100 further includes a metallic coolant 140 arranged within the interstitial volume 112 between the shield 110 and the pressure vessel 130. The metallic coolant 140 includes a metal mixture (or composition, compound, or alloy) that: occupies a liquid state within the operating temperature range of the reactor core 126; circulates around the pressure vessel 130 when the reactor core 126 operates in the operating temperature range; and transfers thermal energy (i.e., heat) between the external wall of the pressure vessel 130 and the shield 110 via convection.

In one example, the metallic coolant 140 includes a mixture of: lead, which absorbs gamma radiation and exhibits a large heat capacity; bismuth, which absorbs gamma radiation and increases a boiling temperature of the mixture; and/or cadmium, which absorbs neutrons; and/or tin, which decreases a melting temperature and decreases a viscosity of the mixture.

The upper and lower seals are configured: to open (e.g., deform, melt, disintegrate, rupture) at a temperature or pressure exceeding the operating condition range; and to pass metallic coolant 140 from the interstitial volume 112 into the lower region 134 of the pressure vessel 130. During an over-temperature event that opens the upper and/or lower melt seals 150, the metallic coolant 140 displaces a moderator (e.g., water) and a working fluid 160 (e.g., water), out of the reactor core 126, thereby isolating all the water (e.g., oxidizer) from the nuclear fuel 124, preventing exothermic reaction of the nuclear fuel 124 (e.g., a zirconium fuel cladding) with the moderator and/or the working fluid 160, and maintaining (or increasing) a melting temperature of the nuclear fuel 124. When flooding the pressure vessel via the seals, the metallic coolant 140 further: encases the nuclear fuel 124, thereby absorbing free neutrons emitted by the nuclear fuel 124 and reducing a fission rate of the nuclear fuel 124; and absorbs heat from the nuclear fuel 124, thereby reducing the temperature of the nuclear reactor 120. The metallic coolant 140 can further circulate between the nuclear fuel 124 and the shield 110 via the upper and lower seal slots 152, thereby transferring heat out of the nuclear fuel 124 via conduction and convection.

The metallic coolant 140 can therefore limit a further increase in temperature within the nuclear reactor 120 and reduce a rate of neutron emission from the nuclear fuel 124 once the melt seals 150 open during an over-temperature event within the system. As the nuclear reactor 120, the metallic coolant 140, and the shield 110 cool over time (e.g., by transferring thermal energy from the shield 110 into nearby ground mass), the metallic coolant 140 can transition from a liquid state into a solid state to fully encase the nuclear fuel 124 and thus form a solid metallic long-term nuclear coffin around the nuclear fuel 124 and thus prevent emission of nuclear radiation beyond the boundary of the nuclear reactor 120.

2.2 Example: Nuclear Reactor Life Cycle

In one example, during steady state operation of the nuclear reactor 120 within the operating temperature range, the moderator and working fluid 160, such as water, enters the pressure vessel 130 via the fluid inlet 136 to cool the nuclear fuel 124 and moderate a fission reaction within the nuclear fuel 124. The nuclear fuel 124 further heats the water, which exits the pressure vessel 130 via the fluid outlet 138. This heated water is then fed to a steam generator, which converts thermal energy (e.g., 80 Megawatts thermal) in this heated water into electrical energy (e.g., 20 Megawatts electric).

The metallic coolant 140 includes a mixture of metals, such as a lead-bismuth eutectic alloy or a lead-tin alloy, in a liquid state at an operating temperature range (e.g., between 150 degrees Celsius and 400 degrees Celsius). During normal operation of the nuclear reactor 120, the metallic coolant 140 flows around the pressure vessel 130 to distribute thermal energy to the shield 110. Thus, the metallic coolant 140 reduces thermal loading on the pressure vessel 130 caused by temperature gradients within the pressure vessel 130.

2.2.1 Operating Period

During the operating period, at the operating temperature range, the metallic coolant 140 additionally absorbs decay energy from the reactor core 126 such as neutron and gamma ray radiation. The metallic coolant 140 acts as an additional liquid shield to prevent radiation from entering the environment around the nuclear reactor 120. Additionally, the metallic coolant 140 defines a boiling point significantly above (e.g., 1,000 degrees Celsius above) the operating temperature range. Below a maximum temperature threshold, the melt seal 150 maintains the metallic coolant 140 outside of the pressure vessel 130 within the interstitial volume 112 and the working fluid 160 (e.g., water) inside of the pressure vessel 130.

2.2.2 Emergency Condition

During an emergency condition (e.g., a cool-down period), the metallic coolant 140 maintains a liquid state. Therefore, the metallic coolant 140 is configured to avoid anomalous material behaviors and excess mechanical strain on the system 100 caused by phase change. At temperatures above the operating temperature range, such as 50 degrees Celsius above the operating temperature range, the melt seal 150 melts (e.g., disintegrates, ruptures), thereby releasing a volume of the metallic coolant 140 into the pressure vessel 130 toward the nuclear fuel 124. The metallic coolant 140 then flows into the pressure vessel 130, displaces the moderator and working fluid 160 (e.g., water) out of the pressure vessel 130 via the fluid outlet 138 and/or the fluid inlet 136, and envelops the nuclear fuel 124.

The metallic coolant 140 thus functions as a liquid nuclear moderator that: captures neutrons to reduce incidence of fission within the reactor core 126; absorbs thermal energy to cool the nuclear fuel 124; and transfers this thermal energy from the nuclear fuel 124 toward the shield 110 via convection. The metallic coolant 140 can therefore decrease the temperature and energy output of the reactor core 126, thereby reducing risk of melt down within the reactor core 126.

In one implementation, the nuclear fuel 124 includes uranium pellets encased in zirconium shells, which may react exothermically with water at temperatures approximating 1200 degrees Celsius. However, upon entering the reactor core 126 under an elevated temperature condition (i.e., above the operating temperature range), the metallic coolant 140 can displace the moderator and working fluid 160 in the lower region of the pressure vessel 130 (e.g., water) away from the nuclear fuel 124 and thus prevent such exothermic oxidation of zirconium shells in the nuclear fuel 124. The metallic coolant 140 thus functions as an emergency heat removal system that displaces the moderator and working fluid 160 (e.g., water)—a hydrogen source—away from the nuclear fuel 124 in order to reduce a detonation risk of the hydrogen and prevent hydrogen embrittlement of the pressure vessel 130 caused by hydrogen gas released during such oxidation of the zirconium shells.

2.2.3 End-of-Life: Nuclear Coffin

Additionally or alternatively, as the nuclear reactor 120 approaches an end of life, the set of control rods 122 in the nuclear reactor 120 remain extended into the nuclear fuel 124, thereby increasing decay heat from the nuclear fuel 124 and increasing a temperature of the pressure vessel above the operating temperature range.

Accordingly, the melt seal(s) 150 can melt, thereby releasing the metallic coolant 140 into the reactor core 126, replacing the moderator and displacing the working fluid 160 in the lower region of the pressure vessel 130. Then, as the reactor core 126 and the metallic coolant 140 cool, the metallic coolant 140 can solidify around the nuclear fuel 124 and thus form a long-term, nuclear coffin encasing the nuclear fuel 124 and preventing emission of nuclear radiation outside of the nuclear reactor 120. Further, the metallic coolant 140—occupying a liquid or solid state—forms a dense barrier around the nuclear reactor 120, thereby: preventing foreign material that may cause corrosion from entering the nuclear reactor 120; preventing access to the nuclear fuel 124 by an unauthorized user; and preventing unauthorized modification or theft of the nuclear reactor 120 and/or the nuclear fuel 124.

2. Shield

The shield 110 encases the pressure vessel 130 with a material configured to absorb energy emitted by the reactor core 126. The shield 110 prevents radiation from escaping into the environment around the nuclear reactor 120. For example, the shield 110 includes a dense material configured to absorb energy in the form of alpha particles, beta particles, neutrons, and gamma rays. In one implementation, the shield 110 includes cast iron that can be cast off-site and defines a thickness (e.g., 0.7 meters).

The shield 110 defines an outer surface and an inner surface. In one implementation, a first portion of the outer surface is configured to be contained within an external medium (e.g., buried below ground, submerged underwater). A second portion of the outer surface can extend above ground. The second portion of the outer surface of the shield 110 can include sealable ports for material to be added to and removed from within the shield 110. The inner surface defines a first boundary of the interstitial volume 112 between the inner surface of the shield 110 and an outer surface of the pressure vessel 130.

4. Nuclear Reactor

The nuclear reactor 120 includes: a pressure vessel 130; a nuclear fuel 124; a set of control rods 122; and/or a reactor core 126.

4.1 Pressure Vessel

The pressure vessel 130 defines a sealable tank configured to contain the reactor core 126 and maintain high pressure within the interior of the pressure vessel 130. The pressure vessel 130 includes an outer surface and an inner surface. The outer surface of the pressure vessel 130 defines a second boundary of the interstitial volume 112. The interstitial volume 112 functions as a liquid metal reservoir configured to contain a volume of the metallic coolant 140 between the shield 110 and the outer surface of the pressure vessel 130.

The inner surface of the pressure vessel 130 is configured to contain a high-pressure system (e.g., at 150 atmospheres) including the reactor core 126. The inner and outer surface can include coatings to reduce incidence of corrosion with a moderator and/or the metallic coolant 140. In one example, the inner surface is clad with stainless steel to avoid corrosion by the moderator, such as water, within the pressure vessel 130 and the outer surface is coated with ceramic coating to avoid corrosion by the metallic coolant 140. In another example, the outer surface is coated with additional additive materials—such as nickel, chromium, molybdenum, niobium, or tungsten—to prevent corrosion by the metallic coolant 140.

Materials configured to maintain the high pressure of the pressure vessel 130 include doped steels such as carbon steel, copper bainitic steels, and/or molybdenum manganese steels. The materials and pressure within the pressure vessel 130 can be chosen based on the application of the nuclear reactor 120. For example, a small nuclear reactor 120 (e.g., 2 m×2 m×8 m) may include a material of the pressure vessel 130 different from a large nuclear reactor 120 (e.g., 4 m×4 m×16 m) such that the smaller pressure vessel 130 of the small reactor can maintain higher pressures than pressure vessel 130 of the large nuclear reactor 120.

4.1.1 Fluid Inlet+Fluid Outlet

The pressure vessel 130 additionally includes a fluid inlet 136 and a fluid outlet 138. The fluid inlet 136 enables high-pressure cool water to enter the pressure vessel 130. The high-pressure cool water flows around the nuclear fuel 124 to moderate the fission reaction and to cool the nuclear fuel 124 by absorbing thermal energy from the nuclear fuel 124. The cool water receives thermal energy from the nuclear fuel 124 and travels out of the pressure vessel 130 via the fluid outlet 138. The fluid inlet 136 and the fluid outlet 138 cooperate to maintain pressures within the pressure vessel 130 within a target pressure range, such as via a set of valves, while maintaining a constant flow rate of water into and out of the pressure vessel 130.

4.1.2 Working Fluid Flow Rate

In one implementation, the fluid inlet 136 is configured to receive working fluid 160 at an inlet flow rate and the fluid outlet 138 is configured to emit working fluid 160 from the pressure vessel 130 at an outlet flow rate. The pressure vessel 130 can further include an inlet valve coupled to the fluid inlet 136 and an outlet valve coupled to the fluid outlet 138. The inlet valve and the outlet valve cooperate to match the inlet flow rate to the outlet flow rate in order to maintain pressures within the pressure vessel 130 within a target pressure range, such as between 140 atmospheres and 160 atmospheres.

In one variation, the fluid inlet 136 is configured to: receive the working fluid 160 from an external water reservoir, via a working fluid 160 supply line, at a first flow rate; and direct the working fluid 160 toward the nuclear fuel 124 to moderate the fission reaction and absorb thermal energy from the nuclear fuel 124. The fluid outlet 138 is configured to: emit the working fluid 160 from the pressure vessel 130 to an external thermal power generation system for conversion of thermal energy into electricity, at a second flow rate proportional to the first flow rate; and cooperate with the fluid inlet 136 to maintain pressures within the pressure vessel 130 within a target pressure range.

For example, the pressure vessel 130 can further include an inlet flow meter coupled to the fluid inlet 136 and configured to outlet a first signal representing the inlet flow rate of water entering the pressure vessel 130 via the fluid inlet 136. The pressure vessel 130 can further include an outlet flow meter coupled to the fluid outlet 138 and configured to outlet a second signal representing the outlet flow rate of water exiting the pressure vessel 130 via the fluid outlet 138. A local or remote controller can then: interpret an inlet flow rate of water (e.g., 0.8 gallons-per-minute) and an outlet flow rate of water (e.g., 0.5 gallons-per-minute) from these signals; and trigger the outlet valve within the fluid outlet 138 to adjust the outlet flow rate to match the inlet flow rate of water. Thus, the fluid inlet 136 and the fluid outlet 138 cooperate to maintain pressures of the pressure vessel 130 within the target pressure range.

Additionally or alternatively, during installation of the system 100, an installer may: read an inlet flow rate of water from the inlet flow meter; read an outlet flow rate of water from the outlet flow meter; and manually adjust the outlet valve to emit water from the fluid outlet 138 at an outlet flow rate corresponding to (e.g., matching, proportional to) the inlet flow rate. Thus, the installer may manually adjust the input flow rate and the output flow rate of water into and out of the pressure vessel 130 to maintain a target pressure (e.g., 150 atmospheres) within the pressure vessel 130 prior to start up.

4.1.2 Upper Region+Lower Region

The pressure vessel 130 additionally defines an upper region 132 and a lower region 134 arranged below the upper region 132. The upper region 132 is configured to store a control material (e.g. a nuclear poison) in a fully retracted position. The lower region 134 stores the nuclear fuel 124. The control material can be actuated from the upper region 132 onto the nuclear fuel 124 in the lower region 134 to capture neutrons within the reactor core 126 and decrease incidence of fission reactions within the reactor core 126.

4.2 Reactor Core+Nuclear Fuel

The nuclear reactor 120 can further include a reactor core 126 arranged within the pressure vessel 130 and defining a column within the upper region 132 and the lower region 134 of the pressure vessel 130. The reactor core 126 includes a moderator (e.g., water), a control material, and the nuclear fuel 124. The nuclear fuel 124 is arranged within the lower region 134 of the pressure vessel 130. The control material is arranged within the upper region 132 of the pressure vessel 130 and aligned with the nuclear fuel 124 along a vertical axis (e.g., a z-axis) of the pressure vessel 130. The moderator (e.g., water) occupies the upper region 132 and the lower region 134 of the pressure vessel 130.

The nuclear fuel 124 includes a fissile material such as enriched uranium-235. The fissile material is configured to undergo an exothermic fission reaction. In one implementation, the reactor core 126 includes a pressurized water reaction (or "PWR"). In this implementation, a high-pressure water reduces movement of the neutrons emitted from the nuclear fuel 124 to increase a likelihood of neutron collision, thereby maintaining the fission reaction at a critical state. In one variation, the nuclear fuel 124 can be solid and non-actuatable.

In another implementation, the nuclear fuel 124 is arranged as a bundle of nuclear fuel 124. For example, the nuclear fuel 124 can be aligned vertically within the lower region 134 of the pressure vessel 130 in a concentric pattern. In another example, the nuclear fuel 124 can be: separated into portions; and arranged in a grid pattern. The nuclear fuel 124 portions can be evenly spaced to enable the moderator (e.g., water) to flow past and cool each portion.

In one variation, the nuclear fuel 124 can include fissile material and the pressure vessel 130 can further include a set of fuel rods arranged within the lower region 134 of the pressure vessel 130. Each fuel rod in the set of fuel rods: defines a minimum diameter within a target diameter range; defines a lateral pitch distance greater than the minimum diameter and less than a maximum diameter of the lower region 134 of the pressure vessel 130; is configured to house the nuclear fuel 124; and is arranged in a radial pattern about a vertical axis of the pressure vessel 130 to enable working fluid 160 to maintain the operating temperature range of the nuclear reactor 120. In one example, the pressure vessel 130 includes a set of (e.g., twelve) of fuel rods, each fuel rod containing sub-5% enriched uranium-235 pellets, arranged in a grid array (e.g., 17×17 grid array) in the lower region of the pressure vessel 130.

4.2 Control Rods

In one variation, the system 100 includes a set of control rods 122 configured to: store a nuclear poison; and actuate, along the vertical axis of the pressure vessel 130, between an extended position (e.g., engaged position) and a retracted position (e.g., disengaged position). The set of control rods 122 transition between the retracted position in the upper region 132 of the pressure vessel 130 and the extended position in the lower region 134 of the pressure vessel 130 to moderate a fission reaction within the nuclear fuel 124.

The nuclear poison: includes enriched boron, cadmium, and/or hafnium; and is configured to absorb neutron radiation emitted by the nuclear fuel 124 via a fission reaction. However, the nuclear poison can include any other material configured to absorb neutron radiation emitted by the nuclear fuel 124.

In the extended position, the set of control rods 122 extend parallel to the vertical axis of the pressure vessel 130 from the upper region 132 into the lower region 134 to cover the nuclear fuel 124 in the lower region 134 of the pressure vessel 130. In the disengaged position, the set of control rods 122 retract from the lower region 134 to the upper region 132 of the pressure vessel 130 to uncover the nuclear fuel 124.

Therefore, the set of control rods 122 can operate between the extended position and the retracted position: to cover and uncover the nuclear fuel 124; to moderate fission reactions within the nuclear fuel 124; to control the flux of neutrons in the pressure vessel 130; and to prevent an over-temperature event of the nuclear reactor 120 (e.g., temperatures within the pressure vessel 130 exceeding the operating temperature range).

5. Melt Seals

The nuclear reactor 120 can include a melt seal 150 configured to seal the pressure vessel 130 from the interstitial volume 112 (e.g., the volume between the inner surface of the shield 110 and the outer surface of the pressure vessel 130) during nominal operation at the nominal operating condition range (e.g., nominal operating temperature and pressure ranges). For example, the melt seal 150 can include zinc or a metal alloy, such as a zinc-aluminum alloy, a zinc-aluminum-magnesium alloy, or a zinc-aluminum-magnesium-copper alloy (e.g., a Zamak alloy). Alternatively, the melt seal 150 can include inert materials configured to prevent reaction with water, the pressure vessel 130, and the metallic coolant 140 within and/or above the operating temperature range.

In one implementation, the nuclear reactor 120 can include an upper melt seal 150 arranged above the lower region 134 of the pressure vessel 130. The nuclear reactor 120 can additionally include a lower melt seal 150 arranged within the lower region 134 of the pressure vessel 130.

Furthermore, the melt seal 150 (or melt seals 150) is configured to seal a seal slot 152 between the inner surface and the outer surface of the pressure vessel 130 within the operating temperature range. The melt seal 150 seals the seal slot 152 by occupying the seal slot 152 including a geometry that matches the melt seal 150 geometry. In one example, the melt seal 150 exhibits a cylindrical geometry and seals an orifice exhibiting the cylindrical geometry. In another example, the melt seal 150 exhibits a circular geometry and seals an orifice exhibiting the circular geometry.

Figure 3A:
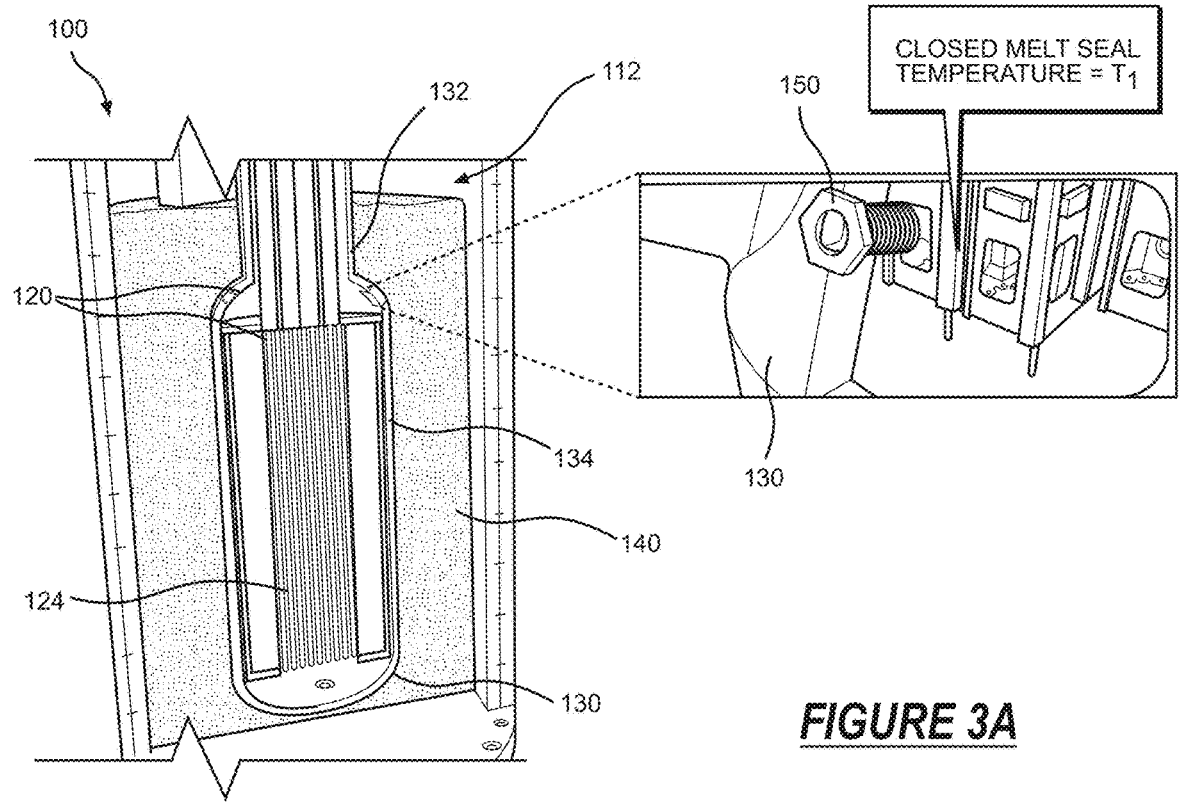
FIGS. 3A and 3B are a schematic representation of one variation of the system.
Figure 3B:
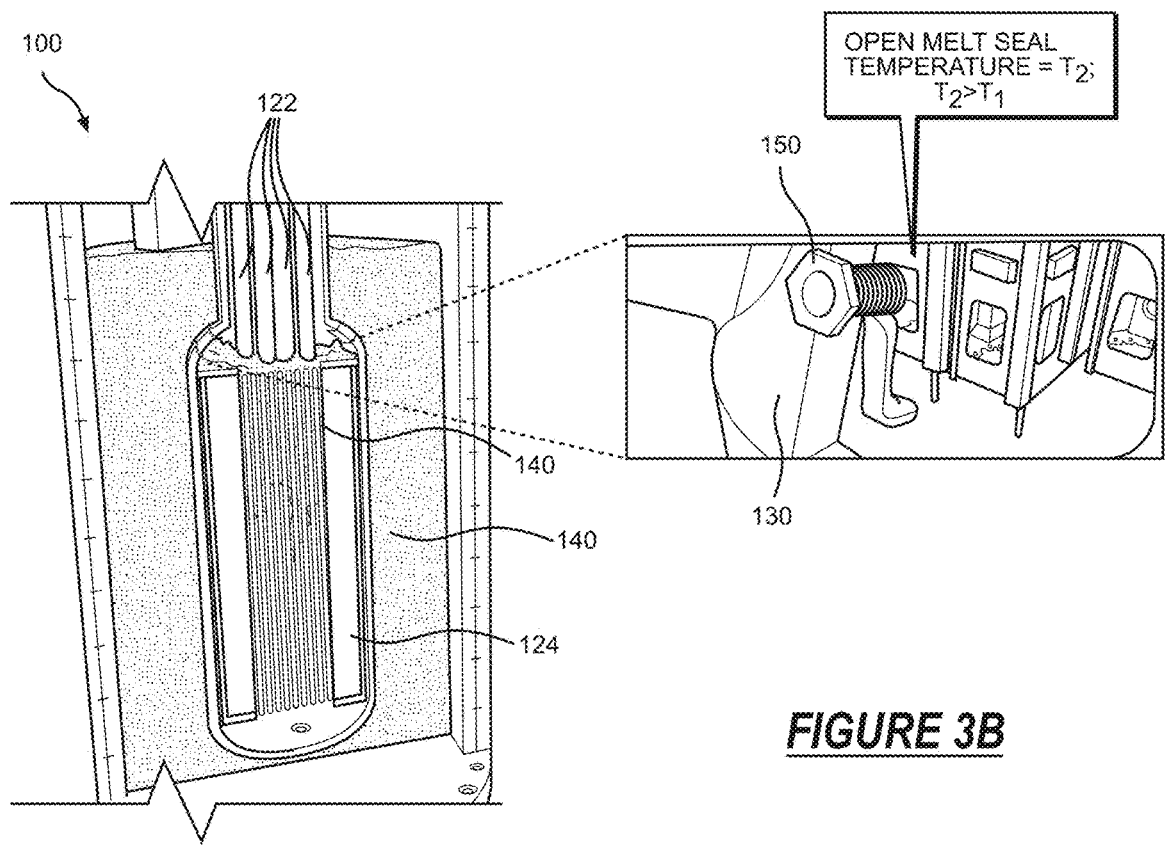

In another implementation, shown in FIGS. 3A and 3B, the melt seal 150 includes a melt plug or a valve, including a seal, configured to: seal the pressure vessel 130 from the interstitial volume 112 at temperatures within the operating temperature range; and melt at a threshold temperature above the operating temperature range. For example, the nuclear reactor 120 is operable within an operating temperature range between 150 degrees Celsius and 400 degrees Celsius. The melt plug or the seal of the valve can melt at 425 degrees Celsius to unseal the seal slot 152 on the pressure vessel 130, thereby releasing a volume of the metallic coolant 140 into the pressure vessel 130.

However, the seal slot 152 can define any other shape or geometry such as: a cylindrical seal slot 152; a flat square or rectangular seal slot 152; a circular seal slot 152; etc. Accordingly, the melt seal 150 can define similar cylindrical, circular, square, rectilinear, or other corresponding geometries configured to locate within the seal slot 152.

5.1 Target Coolant Flow Rate

In one variation, the melt seal 150 is configured to transport a volume of the metallic coolant 140 into the lower region 134 of the pressure vessel 130 at a target coolant flow rate to reduce impact between the volume of the metallic coolant 140 and the set of fuel rods. The target coolant flow rate is a function of the size of the upper melt seal 150 and/or the height of the seal slot 152 relative to the nuclear fuel 124 (e.g., fuel rods) arranged within the lower region 134 of the pressure vessel 130. In one example, the target coolant flow rate is a function of the size of the upper melt seal 150 and includes: transferring a volume of the metallic coolant 140 into the lower region 134 of the pressure vessel 130 at a target coolant flow rate proportional to the size of the upper melt seal 150. In another example, the target flow rate is a function of the height of the seal slot 152 relative to the set of fuel rods arranged within the lower region 134 of the pressure vessel 130 and includes: transferring a volume of the metallic coolant 140 into the lower region 134 of the pressure vessel 130 at a target coolant flow rate proportional to the height of the seal slot 152.

In yet another example, the upper seal slot 152 is of a first size and the pressure vessel 130 includes the set of fuel rods, housing the nuclear material, arranged at a first height within the lower region 134 of the pressure vessel 130. The melt seal 150 is characterized by a second size less than the first size and is arranged at a second height, greater than the first height, between the upper region 132 and the lower region 134 of the pressure vessel 130. The melt seal 150 is further configured to transport a volume of the metallic coolant 140 into the lower region 134 of the pressure vessel 130 at a coolant flow rate, corresponding to (e.g., proportional to) the second size and the second height, to reduce impact between the volume of the metallic coolant 140 and the set of fuel rods.

In another variation, the system 100 further includes a set of splash guards configured to: receive the volume of the metallic coolant 140 prior to the volume of metallic coolant 140 occupying the lower region 134 of the pressure vessel 130 and further reduce incidence of impact with the nuclear fuel 124.

Therefore, the melt seal(s) 150 is configured to transfer a volume of the metallic coolant 140 into the lower region 134 of the pressure vessel 130 at a target coolant flow rate, proportional to a size of the melt seal 150 and a height of the seal slot 152 relative to the nuclear fuel 124—to prevent collision with or damage to the set of fuel rods by the volume of the metallic coolant 140.

5.2 Multiple Melt Seals

Figure 5:
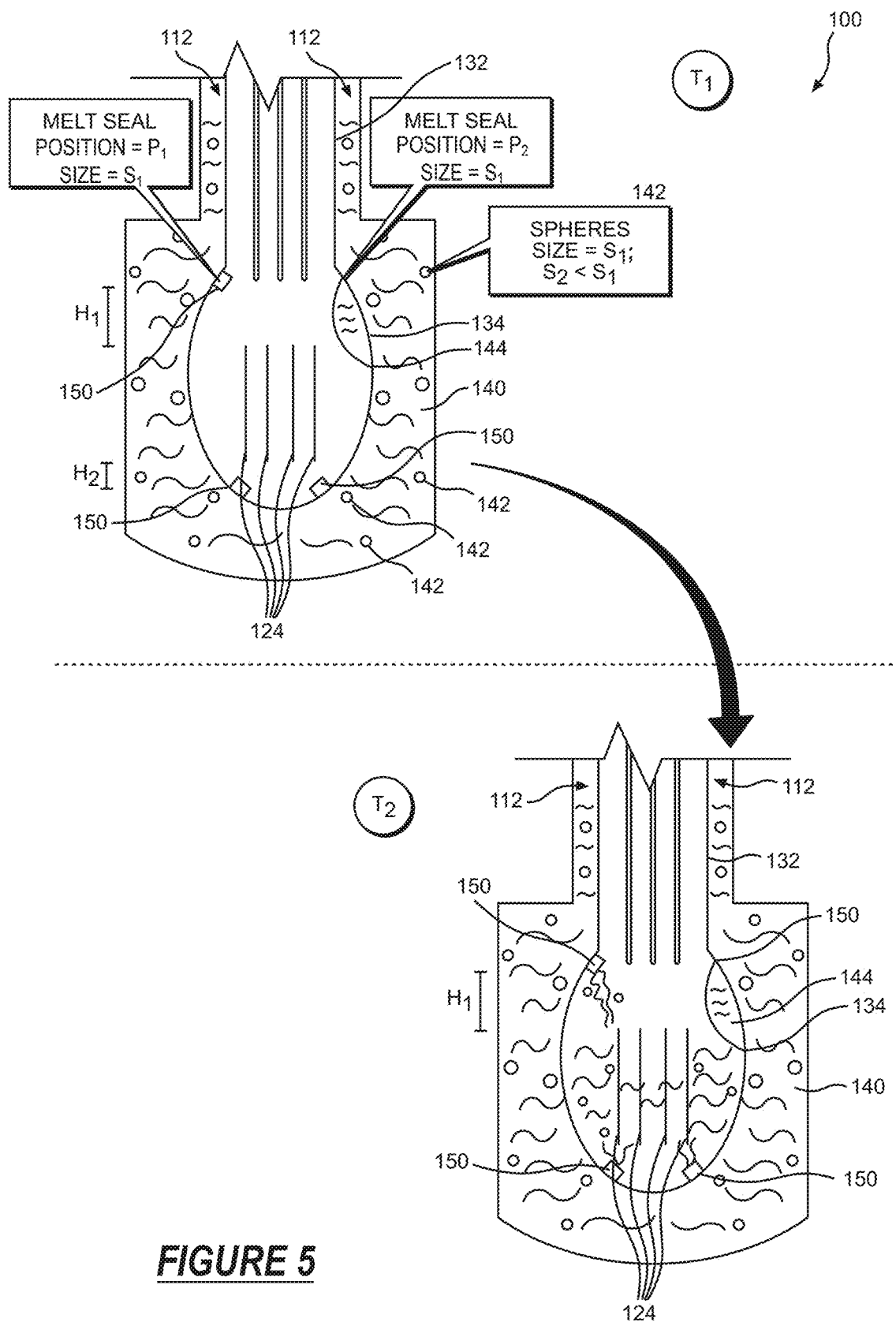
FIG. 5 is a schematic representation of one variation of the system.

The nuclear reactor 120 can include multiple melt seals 150. For example, the pressure vessel 130 can include: an upper melt seal 150 arranged on the pressure vessel and above the nuclear fuel 124; and a lower melt seal 150 arranged on the pressure vessel and below the nuclear fuel 124. At temperatures exceeding the operating temperature range, the upper and lower melt seals 150 enable a volume of the metallic coolant 140 to circulate around and within the pressure vessel 130. Further, the pressure vessel 130 can include: a set of upper melt seals 150 (e.g., 2-6 upper melt seals 150); and a set of lower melt seals 150 (e.g., 2-6 lower melt seals 150). The nuclear reactor 120 can therefore include redundant sets of upper melt seals 150 and lower melt seals 150 to ensure the volume of the metallic coolant 140 releases into the pressure vessel 130, as shown in FIG. 5.

In one implementation, the melt seal 150 includes a burst disc configured to: seal the interstitial volume 112 from the pressure vessel 130 at temperatures within the operating temperature range; and unseal the interstitial volume 112 from the pressure vessel 130 by rupturing at a target pressure above a threshold pressure and at a threshold temperature above the operating temperature range.

In one variation, the system 100 includes an upper melt seal 150 arranged in the upper seal slot 152 and a lower melt seal 150 arranged in the lower seal slot 152. For example, the pressure vessel 130 can define an upper seal slot 152: interposed between the upper region 132 and the lower region 134 of the pressure vessel 130; configured to interface with the upper melt seal 150 to retain the volume of the metallic coolant 140 within the interstitial volume 112 between the shield 110 and the pressure vessel 130 during operation of the nuclear reactor 120; and configured to unseal from the upper seal slot 152 to release the volume of the metallic coolant 140, in a first direction (e.g., downward), into the lower region 134 of the pressure vessel 130 in response to temperatures within the pressure vessel 130 exceeding the operating temperature range.

The pressure vessel 130 further defines a lower seal slot 152: proximal a base of the pressure vessel 130; aligned with and vertically offset from the upper seal slot 152 along a vertical axis of the pressure vessel 130; configured to interface with the lower melt seal 150 to retain the volume of the metallic coolant 140 within the interstitial volume 112 between the shield 110 and the pressure vessel 130 during operation of the nuclear reactor 120; and configured to unseal from the lower seal slot 152 to release the volume of the metallic coolant 140, in a second direction opposite the first direction (e.g., upward), into the lower region 134 of the pressure vessel 130 in response to temperatures within the pressure vessel 130 exceeding the operating temperature range.

In another variation, the system 100 includes a set of (e.g., two) melt plugs arranged in a set of (e.g., two) upper seal slots 152, interposed between the upper region 132 and the lower region 134 of the pressure vessel 130. For example, a first melt plug, in the set of melt plugs is: arranged in a first lateral position in a first upper seal slot 152 of the pressure vessel 130; laterally offset from a vertical axis of the pressure vessel 130; and configured to release a first subvolume of the metallic coolant 140, in a first direction (e.g., downward), into the lower region 134 of the pressure vessel 130 in response to the temperature within the pressure vessel 130 exceeding the operating temperature range. A second melt plug, in the set of melt plugs is: arranged in a second lateral position in a second upper seal slot 152 of the pressure vessel 130; laterally offset from the vertical axis of the pressure vessel 130 opposite the first melt plug; and configured to unseal from the second upper seal slot 152 to release a second subvolume of the metallic coolant 140, in the first direction (e.g., downward), into the lower region 134 of the pressure vessel 130 in response to the temperature within the pressure vessel 130 exceeding the operating temperature range.

Therefore, the system 100 can include redundant sets of upper melt seals 150 and lower melt seals 150 to ensure the metallic coolant 140 releases into the pressure vessel 130 and accounts for melt seal 150 failure (i.e., a melt seal 150 that fails to rupture, melt, or disintegrate).

6. Metallic Coolant

The metallic coolant 140 includes a metal mixture in a liquid state at the operating temperature range. For example, the metallic coolant 140 can include lead or a lead-tin alloy with a low melting point (e.g., between 150 degrees Celsius and 250 degrees Celsius). The metallic coolant 140 occupies the interstitial volume 112 defined by the inner surface of the shield 110 and the outer surface of the pressure vessel 130.

The metallic coolant 140 fills a majority (e.g., between 80% and 95%) of the interstitial volume 112 between the shield 110 and the pressure vessel 130. The remaining interstitial volume 112 can include an inert gas such as nitrogen that compresses as the metallic coolant 140 expands due to rising temperatures. The metallic coolant 140 includes a volume of the metal mixture greater than the volume of the pressure vessel 130 (e.g., ten cubic meters of metallic coolant 140 and two cubic meters within the pressure vessel 130).

The metallic coolant 140 includes a stable metal mixture that does not separate at start up (e.g., between 20 degrees Celsius and 150 degrees Celsius), operation (e.g., between 150 degrees Celsius and 400 degrees Celsius), or melt down (above 450 degrees Celsius) temperatures. The metallic coolant 140 is configured to maintain a liquid state at and above the operating temperature range. For example, the metallic coolant 140 can exhibit a boiling temperature above 2,000 degrees Celsius. Therefore, the metallic coolant 140 can remain in a liquid state within and above the operating temperature range (e.g., between 150 degrees Celsius and 400 degrees Celsius) of the nuclear reactor 120 and can therefore exhibit consistent mixing, gamma absorption, neutron absorption, and vapor pressures within and above the operating temperature range.

The metallic coolant 140 exerts a pressure on the inner surface of the shield 110 and the external surface of the pressure vessel 130 significantly below the pressure within the pressure vessel 130. For example, the metallic coolant 140 applies a 10 atm pressure to the external surface of the pressure vessel 130 while the pressure vessel 130 maintains an internal pressure of 100 atm. Therefore, the metallic coolant 140 does not significantly increase mechanical strain on the shield 110 and pressure vessel 130 compared to the pressure within the pressure vessel 130 and the pressure of the environment outside of the shield 110.

Within the operating temperature range, the metallic coolant 140 fills the interstitial volume 112 extending above the upper melt seal 150 and surrounds the upper region 132 of the pressure vessel 130. The metallic coolant 140 exhibits a density greater than a density of the moderator (e.g., ten times greater than the density of water). Therefore, in response to temperatures in the nuclear reactor 120 exceeding the operating temperature range (e.g., a meltdown event or high temperature event), the melt seal 150 melts, and the metallic coolant 140 floods into the lower region 134 of the pressure vessel 130, replaces the moderator (e.g., water) within the nuclear reactor 120 to maintain the nuclear reactor 120 in a subcritical state, and displaces the working fluid 160 (e.g., water) within the pressure vessel 130, as shown in FIG. 2. The metallic coolant 140 includes a surplus of volume to fill the pressure vessel 130 and completely displace water from the reactor core 126.

6.1 Mixture of Metals

The metallic coolant 140 includes a mixture of metals (e.g., a metal alloy) in a liquid state at the operating temperature range. The mixture of metals is configured to be stable (e.g., not precipitate or separate) below, at, or above the operating temperature range. In one implementation, the metallic coolant 140 includes a mixture of lead, tin, bismuth, and/or cadmium or indium. The metallic coolant 140 includes a set of metallic elements that cooperate to define a target set of properties, such as including: gamma ray shielding; neutron absorption; a boiling point above the operating temperature range (e.g., 1,500 degrees Celsius); and a melting point below 200 degrees Celsius.

For example, lead can exhibit a high density and shield gamma rays emitted by the reactor core 126. In one implementation, the metallic coolant 140 includes a first proportion of lead, such as a majority weight fraction (e.g., 60% by weight) of lead, configured to shield gamma rays. Lead properties additionally include a relatively low effective melting temperature relative to other metals. Therefore, the metallic coolant 140 includes a majority weight fraction of lead to achieve a low effective melting temperature of the mixture near the operating temperature range of the system 100.

The metallic coolant 140 can also include a second proportion of bismuth configured to increase the boiling temperature of the metallic coolant 140. For example, a bismuth-doped metallic coolant 140 exhibits a boiling point above 2,000 degrees Celsius. Therefore, the metallic coolant 140 including bismuth occupies a liquid state (e.g., does not boil) at temperatures up to 2,000 degrees Celsius and thus, exceeds the operating temperature range by 1,500 degrees Celsius.

The metallic coolant 140 can include a third proportion of tin. The third proportion of tin is configured to decrease the viscosity of the metallic coolant 140 and enable flow of the metallic coolant 140 from the interstitial volume 112 into the lower region 134 of the pressure vessel 130. The third proportion of tin is also configured to decrease the melting temperature of the metallic coolant 140—such that the metallic coolant 140 occupies a liquid state at temperatures within the operating temperature range.

The metallic coolant 140 can additionally include a fourth proportion of cadmium and/or indium configured to capture neutrons from the nuclear fuel 124 at temperatures exceeding the operating temperature range. Thus, the fourth proportion of cadmium and/or indium decreases the incidence of neutron collisions in the reactor core 126 and decreases an amount of energy (e.g., radiation and thermal energy) output by the reactor core 126.

6.2 Metallic Coolant Composition

Generally, the metallic coolant composition 140 includes: a first proportion of a first metal; a second proportion of a second metal; and a third proportion of a third metal. The metallic coolant composition 140: occupies the interstitial volume 112 between the nuclear reactor 120 and the shield 110; forms a liquid radiation shield 110 within the nuclear reactor 120; and transfers thermal energy from the nuclear reactor 120 to the shield 110. The metallic coolant composition 140 further flows through a melt seal 150, in response to a temperature within the nuclear reactor 120 exceeding an operating temperature range, to: occupy an internal volume of the nuclear reactor 120 proximal the nuclear fuel 124; replace moderator (e.g., water) within the nuclear reactor 120 to maintain the nuclear reactor 120 in a subcritical state; displace working fluid 160 out of the internal volume of the nuclear reactor 120; absorb radiation from the nuclear fuel 124; and pass thermal energy from the nuclear fuel 124 to the shield 110.

In one implementation, the metallic coolant composition 140 includes: a first proportion of lead configured to absorb gamma radiation emitted by the nuclear fuel 124 within the nuclear reactor 120; a second proportion of bismuth configured to absorb gamma radiation emitted by the nuclear fuel 124 and to increase an effective boiling temperature of the metallic coolant composition 140; and a third proportion of tin. The third proportion of tin is configured to: decrease a viscosity of the metallic coolant composition 140; and cooperate with the first proportion of lead and the second proportion of bismuth to maintain the metallic coolant composition 140 in a liquid state within the operating temperature range of the nuclear reactor 120; and occupy a volume adjacent the nuclear reactor 120. In this implementation, the metallic coolant composition 140 includes: between 35% and 50% by weight of lead; between 25% and 35% by weight of bismuth; and between 5% and 15% by weight of tin.

In one variation, the system 100 is operable within an operating temperature range between 200 degrees Celsius and 400 degrees Celsius and includes a melt seal 150 that melts (e.g., disintegrates, ruptures) at a threshold temperature (e.g., a melting point), such as 425 degrees Celsius. In this variation, the metallic coolant composition 140 includes: 50% by weight of lead; 35% by weight of bismuth; and 15% by weight of tin.

In one implementation, the system 100 further includes a set of particles suspended within the metallic coolant 140 composition at temperatures within the operating temperature range. In one variation, the set of particles include: a fourth proportion of boron carbide configured to absorb neutron radiation emitted by the nuclear fuel 124 succeeding the over-temperature event and a fifth proportion of tungsten configured to cooperate with the fourth proportion of boron-carbide, in a solid state. In this variation, the metallic coolant composition 140 exhibits a first density between 5 g/cm$^3$ and 20 g/cm$^3$. The set of particles 142 exhibit a second density less than the first density, such as between 2 g/cm$^3$ and 5 g/cm$^3$.

In another variation, the set of particles: include a fourth proportion of metal-impregnated ceramic; define a diameter less than a maximum diameter of the first melt seal 150; and are configured to flow through a melt seal 150 into the lower region 134 of the pressure vessel 130, in response to temperatures within the pressure vessel 130 exceeding the operating temperature range. Thus, the set of particles 142 are configured to float within the metallic coolant composition 140 (e.g., suspended within) and absorb neutron radiation emitted by the nuclear fuel 124 succeeding an over-temperature event of the nuclear reactor 120.

Alternatively, the metallic coolant composition 140 can further include a fourth proportion of cadmium configured to: absorb neutron radiation emitted by the nuclear fuel 124 succeeding an over-temperature event of the nuclear reactor 120; and cooperate with the first proportion of lead, the second proportion of bismuth, and the third proportion of tin to maintain the metallic coolant composition 140 in the liquid state within the operating temperature range of the nuclear reactor 120.

6.2.1 Metal Concentrations

In one implementation, the metallic coolant composition 140 includes: a first proportion of a first metal; a second proportion of a second metal; a third proportion of a third metal; and/or a fourth proportion of a fourth metal. For example, the metallic coolant composition 140 includes: a first proportion of lead; a second proportion of bismuth; a third proportion of tin; and/or a fourth proportion of cadmium.

In one variation, the system 100 is operable within an operating temperature range between 200 degrees Celsius and 400 degrees Celsius and includes a melt seal 150 that melts (e.g., disintegrates, ruptures) at a threshold temperature (e.g., a melting point), such as 425 degrees Celsius. In this variation, the metallic coolant composition 140 includes: 50% by weight of lead; 15% by weight of tin; 25% by weight of bismuth; and 10% by weight of cadmium. In this implementation tin yields low viscosity of the metallic coolant 140 near the melting point of the melt seal 150, such as 425 degrees Celsius. Additionally, cadmium absorbs neutrons from nuclear fuel 124 following an over-temperature event.

In another variation, the system 100 is operable within an operating temperature range between 350 degrees Celsius and 550 degrees Celsius, including a melt seal 150 that melts at a threshold temperature, such as 575 degrees Celsius. In this variation, the metallic coolant composition 140 includes: 45% by weight of lead; 5% by weight of tin; 30% by weight of bismuth; and 20% by weight of cadmium. The lower proportion of tin yields higher viscosity of the metallic coolant 140. However, the higher operating temperature range lowers viscosity of metallic coolant 140 during operation. The higher operating temperature range corresponds to higher rate of neutron emission from nuclear fuel 124 during an over-temperature event. The higher proportion of cadmium absorbs this higher rate of neutron emission from nuclear fuel 124 following over-temperature event. Finally, the higher proportion of bismuth yields higher a boiling temperature of the metallic coolant 140 to compensate for the higher operating temperature range and exposure of the metallic coolant 140 to greater temperatures near the nuclear fuel 124 during an over-temperature event.

Therefore, for higher operating temperatures within the nuclear reactor 120 the metallic coolant composition 140 can include higher proportions of cadmium and bismuth in order to increase the rate of neutron absorption and the boiling temperature. Conversely, for lower operating temperatures within the nuclear reactor 120 the metallic coolant composition 140 can include a higher proportion of tin in order to reduce the viscosity of the metallic coolant 140 and therefore increase circulation of the metallic coolant 140 around the pressure vessel 130.

6.2.2 Eutectic Alloy

In one variation, the metallic coolant composition 140 can include a first proportion of a first metal and a second proportion of a second metal cooperating to form a homogeneous mixture (e.g., an eutectic alloy).

In one implementation: the metallic coolant composition 140 can include: a first proportion of lead configured to absorb gamma radiation emitted by the nuclear fuel 124 within the nuclear reactor 120 and to reduce a melting temperature of the metallic coolant 140; and a second proportion of bismuth configured to absorb gamma radiation emitted by the nuclear fuel 124 and to increase a boiling temperature of the metallic coolant composition 140. The lead-bismuth eutectic alloy is characterized by an effective boiling temperature greater than 1,500 degrees Celsius and an effective melting temperature less than 200 degrees Celsius.

In one example, the first proportion of lead and the second proportion of bismuth form an eutectic alloy including between 55% and 56% by weight of lead and between 44% and 45% by weight of bismuth. The eutectic alloy is further characterized by an effective boiling temperature (e.g., 1,670 degrees Celsius, 1749 degrees Celsius) greater than the operating temperature range of the nuclear reactor 120, such as between 150 degrees Celsius and 400 degrees Celsius.

In another example, the first proportion of lead and the second proportion of bismuth form an eutectic alloy including between 90% and 96% by weight of lead and between 4% and 10% by weight of bismuth. In this example, the eutectic alloy is further characterized by a high-boiling point to prevent a loss-of-cooling accident within the nuclear reactor 120.

Therefore, a metallic coolant composition 140, forming a lead-bismuth eutectic alloy, can quickly occupy a liquid state upon start-up and fill the interstitial volume 112 between the shield 110 and the pressure vessel 130.

7. Installation and Assembly

The shield 110, pressure vessel 130, melt seal 150, and nuclear reactor 120 can be assembled off-site and delivered as a single assembly. The assembly can be installed partially below ground level (e.g., for a 12-meter-long nuclear reactor 120, 10 meters of the length can be arranged underground and 2 m of the shield 110 can extend past ground level). Earth, rocks, or concrete can be back filled into the ground external to the assembly to support and maintain the verticality of the assembly. In one implementation, a steel foundation (e.g., steel piles) supports the assembly. Therefore, the assembly is installed onto a level surface for stability.

The metallic coolant 140 can be installed via a seal slot 152 on the portion of the shield 110 that is arranged above ground level. In one implementation, the metallic coolant 140 installs as a solid part or a set of solid parts. For example, at ambient temperature (e.g., 20 degrees Celsius) the metallic coolant 140 occupies a solid state. The metallic coolant 140 can be cast or machined into a single part off-site and arranged within the interstitial volume 112. In another example, the metallic coolant 140 can be input to a seal slot 152 in the shield 110 as a series of small, solid pellets (e.g., between 0.5-inch and 3-inch diameter spheres).

The seal slot 152 of the shield 110 includes a seal to separate the contents of the system 100 from the external environment. The seal can be coupled to the seal slot 152 via welding. Welding the seal to the seal slot 152 heats the metallic coolant 140 and can cause emission of lead fumes from the metallic coolant 140 into the interstitial volume 112. Therefore, the seal can include a flange that is configured to temporarily seal the seal slot 152 from the environment during welding to prevent these lead fumes, emitted from the metallic coolant 140, from leaking into the external environment.

Once the shield 110 is sealed, the system 100 can be heated to reach a startup temperature (e.g., 150 degrees Celsius). At the startup temperature: the metallic coolant 140 occupies a liquid state and flows around the pressure vessel 130 within the interstitial volume 112; and the nuclear reaction within the reactor core 126 increases the temperature to within the operating temperature range. The melt seal 150 can expand due to heating during start up and form a tighter seal between the pressure vessel 130 and the metallic coolant 140.

Therefore, the system 100 can reach a temperature (e.g., 285 degrees Celsius) within the operating temperature range over a period of time (e.g., 12 hours, one day) and without human intervention or interaction to maintain the subcritical state of the nuclear reactor 120.

8. Reactor Operation: Power Generation

Figure 6:
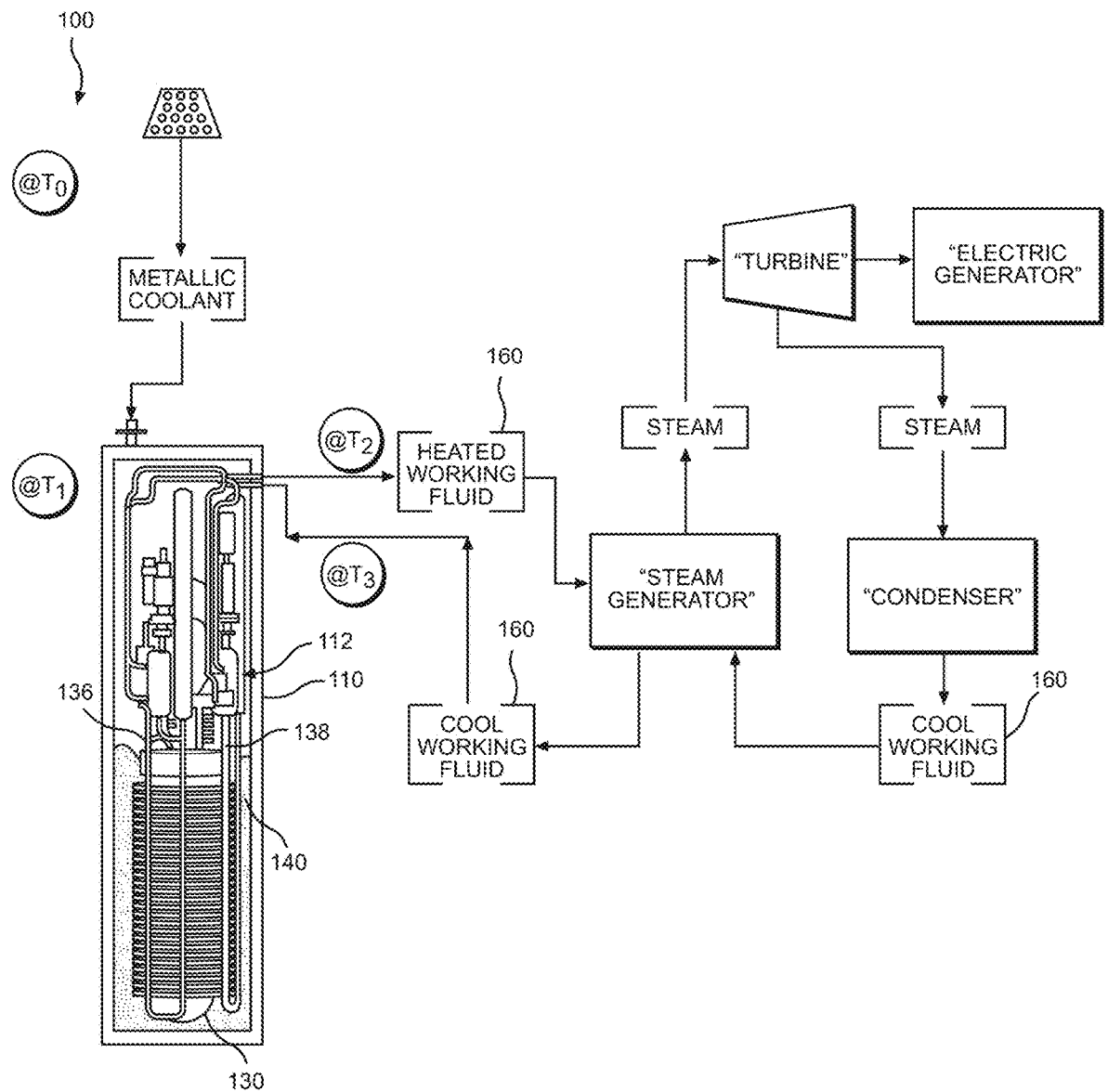
FIG. 6 is a schematic representation of one variation of the system.

In one implementation, the system 100 is operable as a pressurized water reactor to output a moderator containing thermal energy absorbed from the nuclear fuel 124. The moderator, such as low-temperature water, enters the pressure vessel 130 through the fluid inlet 136 (e.g., through a sealed pipe arranged in the seal slot 152 of the shield 110) and flows over the nuclear fuel 124 to cool the nuclear fuel 124 and moderate the fission chain reaction. The nuclear fuel 124 transfers heat to the water and the heated water exits the pressure vessel 130 via the fluid outlet 138 (e.g., through a sealed and shielded pipe arranged in the seal slot 152 of the shield 110) toward an external thermal power generation system for conversion of thermal energy into electricity, as shown in FIG. 6.

The nuclear reactor 120 can output steam or high temperature water to a steam generator for conversion into electrical energy. In one implementation the steam generator is external to the shield 110. The steam generator converts thermal energy, absorbed from the heated water output by the nuclear reactor 120 into steam. The steam generator can transfer the steam to a downstream turbine. The turbine generates electricity from mechanical energy caused by the steam passing through the turbine and moving a turbine blade.

At operating temperature range, the melt seal 150 seals the pressure vessel 130 from the interstitial volume 112. The metallic coolant 140 flows within the interstitial volume 112 and therefore around the outer surface of the pressure vessel 130 to transfer thermal energy from the outer surface of the pressure vessel 130 to the shield 110. Convective currents within the metallic coolant 140 cause mixing of the metallic coolant 140 fluid and dissipate heat throughout the interstitial volume 112. The metallic coolant 140 attenuates gamma ray energy and captures neutrons emitted by the reactor core 126. The shield 110 is configured to capture any remaining radiation not captured by the metallic coolant 140.

9. Reactor Cooldown

The nuclear reactor 120 includes an emergency heat removal system that reduces the rate of fission within the reactor core 126, causing the reaction to enter a subcritical ($k\_eff<1$) state. The emergency heat removal system includes the set of melt seals 150 and the metallic coolant 140. During an over-temperature event, such as temperatures within the nuclear reactor 120 exceeding the operating temperature range (e.g., exceeding 450 degrees Celsius), the set of melt seals 150 unseal (e.g., melt, disintegrate, rupture) from the upper and/or lower seal slots 152 of the pressure vessel 130 to transfer a volume of the metallic coolant 140 from the interstitial volume 112 toward the nuclear fuel 124.

During an over-temperature event, the reactor core 126 produces excess heat that can cause the moderator (e.g., water) to boil within the pressure vessel 130. The phase change of the moderator causes excess thermal and mechanical stress to the pressure vessel 130 that can lead to pressure vessel 130 failure.

At temperatures exceeding the operating temperature range, the set of melt seals 150 melt to unseal the seal slot 152 between the pressure vessel 130 and the interstitial volume 112. The set of melt seals 150 are arranged at various heights on the pressure vessel 130. For example, the pressure vessel 130 can include four melt seals 150 along an upper surface of the lower region 134 of the pressure vessel 130 and four melt seals 150 along a lower surface of the lower region 134 of the pressure vessel 130. The melt seals 150: define multiple ingress points for the metallic coolant 140; and enable the metallic coolant 140 to flow through and around the pressure vessel 130 to distribute thermal energy once the metallic coolant 140 is released. The interstitial volume 112 contains a surplus of the metallic coolant 140.

For example, the volume between the shield 110 and the pressure vessel 130 can contain 10 cubic meters of metallic coolant 140, while the volume of the pressure vessel 130 includes only two cubic meters of volume. The surplus volume of the metallic coolant 140 is configured to fill the volume of the pressure vessel 130 and continue to flow around the exterior of the pressure vessel 130. Therefore, the moderator (e.g., all water) within the pressure vessel 130 is displaced by the metallic coolant 140 and reduces the rate of fission within the reactor core 126, causing the reaction to enter a subcritical state. The pressure vessel 130 is further sealed with radiation shielding material.

In response to temperatures within the nuclear reactor 120 exceeding the operating temperature range, the melt seal 150 is configured to unseal the pressure vessel 130 from the volume outside the pressure vessel 130. The melt seal 150 unseals the pressure vessel 130 by melting within the seal slot 152 of the pressure vessel 130. The melt seal 150 deforms via melting until the melt seal 150 reaches a liquid state and thereby, enables the metallic coolant 140 to flow into the pressure vessel 130.

9.1 Moderator Displacement+External Working Fluid Reservoir

The metallic coolant 140 exhibits a density greater than the density of the moderator (e.g., 5-20 times greater than the density of water). The metallic coolant 140 can thus, displace the moderator from the pressure vessel 130, prevent the moderator from boiling within the pressure vessel 130, and prevent excess thermal and mechanical stress within the pressure vessel 130, as shown in FIG. 4.

In this implementation, in response to an over-temperature event: the set of melt seals 150 melt and dislodge from their slots on the surface of the pressure vessel 130; and the metallic coolant 140 flows into the pressure vessel 130 and toward the reactor core 126 via the seal slots 152. The metallic coolant 140 displaces the moderator out of the reactor core 126, upwardly and away from the reactor core 126, and out of the pressure vessel 130 via the fluid inlet and/or fluid outlet. Accordingly, inflow of the metallic coolant 140 into the pressure vessel 130 may transiently increase pressure within the pressure vessel 130 and trigger the valve to transition to the over-temperature state, thereby releasing the moderator (e.g., water in a liquid and/or a gaseous state) out of the pressure vessel 130 and into the external water containment reservoir. Therefore, the external water containment reservoir can accumulate moderator excess pressure displaced from the pressure vessel 130 by the metallic coolant 140 in response to the metallic coolant 140 flowing into the pressure vessel 130.

Furthermore, the external water containment reservoir can additionally accumulate toxic lead fumes from the heated metallic coolant 140 fluid. The valve can be configured to seal the external water containment reservoir, such as after an interval of time or upon entry of a target mass flowing into the reservoir.

The metallic coolant 140 reduces energy emitted by the reactor core 126 by replacing the moderator in the pressure vessel 130. The metallic coolant 140 surrounds the nuclear fuel 124 and absorbs neutrons. Slowing and/or halting the movement of neutrons reduces the incidence of neutron-neutron collisions, and therefore reduces the state of the reaction to a subcritical state.

The metallic coolant 140 circulates around and within the pressure vessel 130 to distribute thermal energy. Convective currents caused by temperature differentials within the pressure vessel 130 cause mixing within the metallic coolant 140. The metallic coolant 140 can flow from an area of high heat within the pressure vessel 130 to an area of lower heat outside of the pressure vessel 130 and transfer heat to the shield 110. The metallic coolant 140 can flow through each of the open seal slots 152 left by the set of melt seals 150 to enable multiple pathways of convective flows.

The metallic coolant 140: stalls the fission reaction within the reactor core 126 by capturing neutrons; and transfers excess thermal energy to the shield 110. Therefore, the metallic coolant 140 maintains the fidelity of the pressure vessel 130 and forms a sealed, low-pressure system within the shield 110.

9.2 Variation: Cooldown Subsystem

In one variation, the system 100 can include a metallic coolant reservoir 144 arranged within the pressure vessel 130 and configured to contain a second volume of metallic coolant 140. The metallic coolant reservoir 144 can include a melt seal(s) 150 configured to rupture and pass the second volume of metallic coolant 140 into the lower region 134 of the pressure vessel 130. In this variation, the first volume of metallic coolant 140—occupying the interstitial volume 112 between the shield 110 and the pressure vessel 130—continues to flow around the pressure vessel 130 during an over-temperature event.

In one implementation, the system 100 can include the shield 110, the pressure vessel 130, nuclear fuel 124 arranged within the lower region 134 of the pressure vessel 130, the shield 110 arranged about the nuclear reactor 120, and a primary metallic coolant 140 (e.g., the first volume of metallic coolant 140) occupying the interstitial volume 112 between the nuclear reactor 120 and the shield 110, as described above. The system 100 can further include a metallic coolant reservoir 144 interposed between the upper region 132 and the lower region 134, arranged within an internal wall of the pressure vessel 130, and/or arranged within the upper region 132 of the pressure vessel 130.

Furthermore, the metallic coolant reservoir 144 is configured to contain a secondary metallic coolant 140, such as a second volume of metallic coolant 140 less than the first volume of metallic coolant 140. The first volume of metallic coolant 140 approximates (e.g., matches) the interstitial volume 112 between the shield 110 and the pressure vessel 130. The second volume of metallic coolant 140 approximates an internal volume of the lower region 134 of the pressure vessel 130 to encompass the nuclear fuel 124 and completely displace the moderator (e.g., water) from the reactor core 126 during an over-temperature event. For example, the first volume of metallic coolant 140 can include a lead-bismuth eutectic alloy including between 55% and 56% by weight of lead and between 44% and 45% by weight of bismuth. The second volume of metallic coolant 140 can include: 100% by weight of lead or between 94% and 96% by weight of lead; and between 4% and 6% by weight of bismuth.

For example, the metallic coolant reservoir 144: is arranged within the upper region 132 of the pressure vessel 130; defines a diameter less than a minimum inner diameter of the pressure vessel 130 and greater than a combined diameter of the set of control rods 122; and is configured to contain a second volume of the metallic coolant 140, less than the first volume of metallic coolant 140, during the operating period. The metallic coolant reservoir 144 can further include a set of melt seals 150: arranged on the base of the metallic coolant reservoir 144; and configured to unseal from the base of the metallic coolant reservoir 144 to pass the second volume of the metallic coolant 140 from the metallic coolant reservoir 144 toward the nuclear fuel 124 during a cooldown period. The second volume of metallic coolant 140 then transfers thermal energy from the nuclear fuel 124 to the first volume of metallic coolant 140 and the first volume of metallic coolant 140 transfers the thermal energy to the shield 110. The melt seals 150 are configured to maintain the volume of the metallic coolant 140 within the interstitial volume 112 during the cooldown period.

In another variation, the system 100 can include a metallic coolant reservoir 144 arranged within the pressure vessel 130 and configured to contain a second volume of metallic coolant 140. The melt seal(s) 150, arranged on the pressure vessel, are configured to rupture and pass the first volume of metallic coolant 140—occupying the interstitial volume 112 between the shield 110 and the pressure vessel 130—into the lower region 134 of the pressure vessel 130. In this variation, the second volume of metallic coolant 140 remains within the metallic coolant reservoir 144 during an over-temperature event and transfers thermal energy from the nuclear fuel to the shield 110, as shown in FIG. 5.

Therefore, the system can include a primary metallic coolant 140 occupying the interstitial volume 112 between the shield 110 and the pressure vessel 130 and a secondary metallic coolant 140 contained within an internal volume of the metallic coolant reservoir 144. The primary metallic coolant 140 and the secondary metallic coolant 140 cooperate to transfer thermal energy, via convection, from the nuclear reactor 120 to the shield 110 during an over-temperature event and to fully encase the nuclear fuel 124 as a nuclear coffin.

10. End of Life

Once the melt seal(s) 150 release and the metallic coolant 140 is transferred into the reactor core 126 to poison and cool the nuclear fuel 124, the metallic coolant 140 transitions from the liquid state to a solid state to encase the nuclear fuel 124 and maintain a maximum temperature of the nuclear reactor 120 substantially below (e.g., 1,000 degrees Celsius below) the effective boiling temperature of the metallic coolant 140.

More specifically, as the reactor core 126 and the metallic coolant 140 cool, the metallic coolant 140 can solidify around the nuclear fuel 124 and thus form a long-term, nuclear coffin encasing the nuclear fuel 124 and preventing emission of nuclear radiation outside of the nuclear reactor 120. Further, the metallic coolant 140—occupying liquid or solid state—forms a dense barrier around the nuclear reactor 120 thereby preventing foreign material from entering the nuclear reactor 120 that may cause corrosion.

As a person skilled in the art will recognize from the previous detailed description and from the figures and claims, modifications and changes can be made to the embodiments of the invention without departing from the scope of this invention as defined in the following claims.

We claim:

1. A system comprising:
    a shield:
        defining an internal volume; and
        configured to absorb radiation;
    a nuclear reactor comprising:
        a pressure vessel:
            arranged within the internal volume; and
            defining:
                an upper region;
                a lower region arranged below the upper region; and
                an upper seal slot interposed between the upper region and the lower region;
                a lower seal slot aligned with and vertically offset from the upper seal slot along a vertical axis of the pressure vessel;
        a nuclear fuel arranged within the lower region of the pressure vessel and configured to heat a working fluid entering the pressure vessel, via a fission reaction; and
        a set of control rods configured to transition between the upper region and the lower region of the pressure vessel to moderate the fission reaction within the nuclear fuel;
    a metallic fluid:
        comprising a mixture of metals comprising:
            a first proportion of lead configured to decrease an effective melting temperature of the metallic fluid and absorb gamma radiation emitted by the nuclear fuel;
            a second proportion of bismuth configured to absorb gamma radiation emitted by the nuclear fuel and to increase an effective boiling temperature of the metallic fluid; and
            a third proportion of cadmium configured to absorb neutron radiation emitted by the nuclear fuel;
        in a liquid state within an operating temperature range of the nuclear reactor; and
        configured to:
            occupy an interstitial volume between the shield and the pressure vessel;
            transfer thermal energy from the pressure vessel into the shield to distribute heat around the pressure vessel within the operating temperature range; and
            absorb radiation emitted by the nuclear reactor; and
    a first melt seal:
        arranged in the upper seal slot of the pressure vessel;
        configured to retain a volume of the metallic fluid within the interstitial volume between the shield and the pressure vessel during operation of the nuclear reactor; and
        configured to unseal from the upper seal slot to release metallic fluid, in the volume of the metallic fluid, into the lower region of the pressure vessel, the volume of the metallic fluid displacing the working fluid away from the nuclear fuel, in response to temperatures within the pressure vessel exceeding the operating temperature range; and
    a second melt seal:
        arranged in the lower seal slot of the pressure vessel;
        configured to cooperate with the first melt seal to retain the volume of the metallic fluid within the interstitial volume between the shield and the pressure vessel during operation of the nuclear reactor; and
        configured to unseal from the lower seal slot to release metallic fluid, in the volume of the metallic fluid, into the lower region of the pressure vessel in response to temperatures within the pressure vessel exceeding the operating temperature range.

2. The system of claim 1:
    wherein the pressure vessel defines the lower seal slot: proximal a base of the pressure vessel.

3. The system of claim 1:
    wherein the nuclear reactor is configured to operate within the operating temperature range between 150 degrees Celsius and 450 degrees Celsius; and
    wherein the metallic fluid coolant is characterized by an effective boiling temperature greater than the operating temperature range to maintain homogeneity of the mixture of metals at temperatures outside of the operating temperature range.

4. The system of claim 1, wherein the pressure vessel comprises:
    a fluid inlet configured to:
        receive the working fluid from an external water reservoir, via a working fluid supply line, at a first flow rate; and
        direct the working fluid toward the nuclear fuel to moderate the fission reaction and absorb thermal energy from the nuclear fuel; and a fluid outlet configured to:
emit the working fluid from the pressure vessel to an external thermal power generation system for conversion of thermal energy into electricity, at a second flow rate proportional to the first flow rate; and
cooperate with the fluid inlet to maintain pressures within the pressure vessel within a target pressure range.

5. The system of claim 1:
wherein the pressure vessel defines a second upper seal slot interposed between the upper region and the lower region of the pressure vessel;
wherein the first melt seal comprises a first melt plug:
arranged in a first lateral position in the upper seal slot of the pressure vessel;
laterally offset from a vertical axis of the pressure vessel; and
configured to release a first subvolume of the metallic fluid into the lower region of the pressure vessel in response to the temperature within the pressure vessel exceeding the operating temperature range; and
wherein the second melt seal comprises a second melt plug:
arranged in a second lateral position in the second upper seal slot of the pressure vessel;
laterally offset from the vertical axis of the pressure vessel opposite the first melt plug; and
configured to unseal from the lower seal slot to release a second subvolume of the metallic fluid into the lower region of the pressure vessel in response to the temperature within the pressure vessel exceeding the operating temperature range.

6. The system of claim 1:
wherein the nuclear fuel
a set of fuel rods, each fuel rod in the set of fuel rods:
defining a minimum diameter within a target diameter range;
defining a lateral pitch distance:
greater than the minimum diameter; and
less than a maximum diameter of the lower region of the pressure vessel;
configured to house a fissile material; and
arranged in a radial pattern about a vertical axis of the pressure vessel.

7. The system of claim 6:
wherein the set of fuel rods are arranged at a first height within the lower region of the pressure vessel; and
wherein the first melt seal is:
arranged at a second height, greater than the first height, between the upper region and the lower region of the pressure vessel; and
configured to release metallic fluid, in the volume of the metallic fluid, into the lower region of the pressure vessel at a first flow rate, corresponding to the first size and the second height, to reduce impact between the volume of the metallic fluid and the set of fuel rods.

8. The system of claim 1, wherein the mixture comprises:
a fourth proportion of tin configured to decrease a viscosity of the metallic fluid.

9. The system of claim 1, wherein the metallic fluid:
forms a eutectic alloy;
forms the effective melting temperature of the metallic fluid between 150 degrees Celsius and 250 degrees Celsius; and
forms the effective boiling temperature of the metallic fluid exceeding the operating temperature range of the nuclear reactor.

10. The system of claim 1, wherein the metallic fluid comprises:
the first proportion of lead configured to absorb gamma radiation emitted by the nuclear fuel succeeding an over-temperature event;
the second proportion of bismuth configured to absorb gamma radiation emitted by the nuclear fuel succeeding the over-temperature event; and
the third proportion of cadmium configured to absorb neutron radiation emitted by the nuclear fuel succeeding the over-temperature event.

11. A system comprising:
a nuclear reactor comprising:
a pressure vessel defining:
an upper region;
a lower region arranged below the upper region;
an upper seal slot interposed between the upper region and the lower region; and
a lower seal slot aligned with and vertically offset from the upper seal slot along a vertical axis of the pressure vessel;
a nuclear fuel arranged within the lower region of the pressure vessel and configured to heat a working fluid entering the pressure vessel, via a fission reaction; and
a set of control rods configured to transition between the upper region and the lower region of the pressure vessel to moderate the fission reaction within the nuclear fuel;
a metallic fluid:
comprising:
a first proportion of lead configured to decrease an effective melting temperature of the metallic fluid and absorb gamma radiation emitted by the nuclear fuel;
a second proportion of bismuth configured to absorb gamma radiation emitted by the nuclear fuel and to increase an effective boiling temperature of the metallic fluid; and
a third proportion of cadmium configured to absorb neutron radiation emitted by the nuclear fuel;
in a liquid state within an operating temperature range of the nuclear reactor; and
configured to:
occupy an interstitial volume between a shield and the pressure vessel; and
absorb radiation emitted by the nuclear reactor;
a first melt seal:
arranged in the upper seal slot of the pressure vessel;
configured to retain a volume of the metallic fluid within the interstitial volume between the shield and the pressure vessel during operation of the nuclear reactor; and
configured to unseal from the upper seal slot to release metallic fluid, in the volume of the metallic fluid, into the lower region of the pressure vessel, the volume of the metallic fluid displacing the working fluid away from the nuclear fuel, in response to temperatures within the pressure vessel exceeding the operating temperature range; and
a second melt seal:
arranged in the lower seal slot of the pressure vessel;
configured to cooperate with the first melt seal to retain the volume of the metallic fluid within the interstitial volume between the shield and the pressure vessel during operation of the nuclear reactor; and configured to unseal from the lower seal slot to release metallic fluid, in the volume of the metallic fluid, into the lower region of the pressure vessel in response to temperatures within the pressure vessel exceeding the operating temperature range.

12. A system comprising:

a nuclear reactor comprising:
   a pressure vessel defining:
      an upper region;
      a lower region arranged below the upper region;
      a first seal slot interposed between the upper region and the lower region; and
      a second seal slot aligned with and vertically offset from the first seal slot along a vertical axis of the pressure vessel; and
   a nuclear fuel arranged within the lower region of the pressure vessel and configured to heat a working fluid entering the pressure vessel, via a fission reaction; and a metallic fluid:
   comprising:
      a first proportion of lead configured to decrease an effective melting temperature of the metallic fluid and absorb gamma radiation emitted by the nuclear fuel;
      a second proportion of bismuth configured to absorb gamma radiation emitted by the nuclear fuel and to increase an effective boiling temperature of the metallic fluid; and
      a third proportion of cadmium configured to absorb neutron radiation emitted by the nuclear fuel;
   in a liquid state within an operating temperature range of the nuclear reactor; and
   configured to:
      occupy an interstitial volume between a shield and the pressure vessel; and
      absorb radiation emitted by the nuclear reactor; and a first melt seal:
   arranged in the first seal slot of the pressure vessel;
   configured to retain metallic fluid within the interstitial volume between the shield and the pressure vessel during operation of the nuclear reactor; and
   configured to unseal from the first seal slot to release metallic fluid into the lower region of the pressure vessel in response to temperatures within the pressure vessel exceeding the operating temperature range to displace the working fluid away from the nuclear fuel; and a second melt seal:
   arranged in the second seal slot of the pressure vessel;
   configured to retain metallic fluid within the interstitial volume between the shield and the pressure vessel during operation of the nuclear reactor; and
   configured to unseal from the second seal slot to release metallic fluid into the lower region of the pressure vessel in response to temperatures within the pressure vessel exceeding the operating temperature range to displace the working fluid away from the nuclear fuel.

\* \* \* \* \*